(12) United States Patent
Siourthas et al.

(10) Patent No.: US 8,943,573 B2
(45) Date of Patent: Jan. 27, 2015

(54) AUTHENTICATION SYSTEM AND PROCESS

(75) Inventors: Constantine Siourthas, Victoria (AU); Bjarne Staugaard Matzen, Victoria (AU)

(73) Assignee: FMT Worldwide Pty Ltd, Melbourne (AU)

( * ) Notice: Subject to any disclaimer, the term of this patent is extended or adjusted under 35 U.S.C. 154(b) by 1164 days.

(21) Appl. No.: 12/305,158

(22) PCT Filed: Jun. 15, 2007

(86) PCT No.: PCT/AU2007/000842
§ 371 (c)(1),
(2), (4) Date: Sep. 29, 2009

(87) PCT Pub. No.: WO2007/143795
PCT Pub. Date: Dec. 21, 2007

(65) Prior Publication Data
US 2010/0024024 A1 Jan. 28, 2010

Related U.S. Application Data

(60) Provisional application No. 60/814,089, filed on Jun. 16, 2006.

(51) Int. Cl.
*H04L 29/06* (2006.01)
*G06F 21/35* (2013.01)
(Continued)

(52) U.S. Cl.
CPC ............... *H04L 63/18* (2013.01); *G06F 21/35* (2013.01); *G06F 21/43* (2013.01); *H04L 63/0853* (2013.01); *H04L 9/3234* (2013.01); *H04L 2209/56* (2013.01)
USPC .................................................. 726/9; 726/28

(58) Field of Classification Search
CPC ...... G06F 21/35; G06F 21/43; H04L 63/0853
USPC .......................................................... 726/9, 28
See application file for complete search history.

(56) References Cited

U.S. PATENT DOCUMENTS

| 4,679,236 A | 7/1987 | Davies |
| 5,323,465 A * | 6/1994 | Avarne ........................ 713/184 |

(Continued)

FOREIGN PATENT DOCUMENTS

| ES | WO 02/19593 | * | 3/2002 |
| FR | 2829647 A1 | | 3/2003 |

(Continued)

OTHER PUBLICATIONS

Lin, "Authentication Schemes Based on the EAP-SIM Mechanisms in GSM-WLAN Heterogenous Mobile Networks", 2009, IEEE, p. 2089-2094.*

*Primary Examiner* — Mahfuzur Rahman
*Assistant Examiner* — Gregory Lane
(74) *Attorney, Agent, or Firm* — Banner & Witcoff, Ltd.

(57) ABSTRACT

An authentication system including: (i) a user device, such as a mobile phone or media player, for storing random identification data for a user of the user device, and for processing entered token data to generate response data on the basis of the identification data; (ii) a client device, such as a personal computer, for use by the user to request a session, such as an online banking session, with a server system, for receiving the token data in response to the request, and for sending the response data to the server system; and (iii) a server of the server system, for storing the random identification data for the user, generating the token data for the client device on the basis of the identification data in response to the request, and for processing the response data to determine authentication for the client device for the session.

19 Claims, 5 Drawing Sheets

(51) Int. Cl.
*G06F 21/43* (2013.01)
*H04L 9/32* (2006.01)

(56) References Cited

U.S. PATENT DOCUMENTS

| | | | |
|---|---|---|---|
| 5,638,444 A * | 6/1997 | Chou et al. | 380/284 |
| 2005/0210264 A1* | 9/2005 | Vesikivi et al. | 713/185 |
| 2006/0005263 A1* | 1/2006 | Hardt | 726/28 |
| 2006/0282660 A1* | 12/2006 | Varghese et al. | 713/155 |
| 2008/0034421 A1* | 2/2008 | Ahn et al. | 726/17 |

FOREIGN PATENT DOCUMENTS

| | | |
|---|---|---|
| WO | 9600485 | 1/1996 |
| WO | 01/17310 A1 | 3/2001 |
| WO | 02/19593 A2 | 3/2002 |
| WO | 2006/012058 A1 | 2/2006 |

\* cited by examiner

AUTHENTICATION SYSTEM AND PROCESS

CROSS REFERENCE TO RELATED APPLICATIONS

This is a U.S. National Phase Application under 35 U.S.C. §371 of International Application No. PCT/AU2007/000842 filed Jun. 15, 2007, which was published Under PCT Article 21(2), which claims priority to U.S. provisional application No. 60/814,089, filed Jun. 16, 2006, the entire contents of which are incorporated herein by reference.

FIELD

The present invention relates to an authentication system and process.

BACKGROUND

To conduct transactions over a communications network, in particular the Internet, the parties involved normally require use of a trusted or secure communications protocol together with a system for validly identifying or authenticating the parties to one another. The communications between the parties can be secured by employing various encryption technologies, such as that used in the SSL (Secure Sockets Layer) protocol, and transactions between large commercial parties or businesses can employ elaborate and permanent authentication processes, such as that used for EDI transactions. For business to consumer transactions, however, it is not normally commercially expedient, efficient or practical to employ elaborate authentication processes, particularly for transaction systems that need to communicate with a large number and wide variety of consumers.

For example, most banks have now established online banking systems that allow the customers of the banks to perform transactions with the bank and other parties over the Internet. The online banking systems include a variety of authentication systems or processes to authenticate a customer, or user, when they seek to commence a communications session, or login to the online banking system, so that transactions can be performed. The authentication system authenticates the client device that the user uses to access the banking system, and in fact validates that the user or customer is using that client device to access the system.

Many different authentication systems are employed by banking institutions. For example, some online banking systems use SSL and only require a username and password combination to be correctly submitted for authentication. Other banks require additional authentication processes. For example the National Australia Bank system, on receiving a payment request from a customer, sends an SMS (Short Message Service) message with a random alphanumeric string to a customer's cell or mobile phone. The authentication system then requires the string to be entered as a password by the customer into the client device for submission to the banking system. Both techniques are unfortunately vulnerable to compromise by an unauthorised party. Username and password combinations are readily obtained by unauthorised parties using web sites that replicate the sites of online banking systems, and are promoted by phishing techniques. Packet analysers are also employed to "sniff" packets of communications to the banking systems. The one time passwords of the SMS messages can also be obtained (as they are transmitted in a clear text form) by wirelessly monitoring messages sent from identified SMS servers or to identified mobile phone numbers.

An authentication system used by HSBC Bank Australia Ltd includes a key ring device produced by Vasco Data Security International that is provided to customers. Whenever a customer seeks to login to the HSBC online banking system, the authentication system sends a web form requesting submission of a data string. The data string required to be submitted is provided by a display of the key ring device after selecting an activation button on the device. The number provided on the display, once submitted using the web form, is validated by the authentication system to authenticate the client device of the user. The key ring device performs a random number generation process which is also performed by the HSBC online banking system. The two processes are synchronised so that the same random numbers are generated at predetermined periods of time, eg every 30 seconds, and can be compared for authentication. There are however inherent problems with this authentication system. Firstly, the random number generation sequence can be compromised or disabled if the processes lose synchronisation, such as due to a power loss. Also, the system relies upon the provision of a unique dedicated hardware device, which customers must retain. In addition to the costs associated with the dedicated device, significant problems occur if the device is lost, stolen, or loses synchronisation.

Accordingly, it is desired to address the above or at least provide a useful alternative.

SUMMARY

In accordance with the present invention there is provided an authentication system including:
  a user device for storing random identification data for a user of said user device, and for processing entered token data to generate response data on the basis of said identification data;
  a client device for use by said user to request a session with a server system, for receiving said token data in response to said request, and for sending said response data to said server system; and
  a server of said server system, for storing said random identification data for said user, generating said token data for said client device on the basis of said identification data in response to said request, and for processing said response data to determine authentication for said client device for said session.

The present invention also provides an authentication system including:
  a device application for storing random identification data for a user and for processing entered token data to generate response data on the basis of said identification data; and
  an authentication module for storing said random identification data for said user, receiving a request for a session with a server system, said request sent from a client device for use by said user, for generating and sending said token data for said client device on the basis of said identification data in response to said request, and for receiving said response data from the user and processing said response data to determine authentication for said client device for said session.

The present invention also provides an authentication process, including:
  receiving a request for a session from a client device used by a user;
  generating and sending token data to the client device, said token data being generated on the basis of stored identification data for said user;

providing an application to process the token data on a user device storing said identification data for the user, to generate response data on the basis of said identification data;

receiving the response data from the user; and processing said response data to determine authentication for said client device for said session.

BRIEF DESCRIPTION OF THE DRAWINGS

Preferred embodiments of the present invention are hereinafter described, by way of example only, with reference to the accompanying drawings, wherein.

DETAILED DESCRIPTION OF PREFERRED EMBODIMENTS

Figure 1:
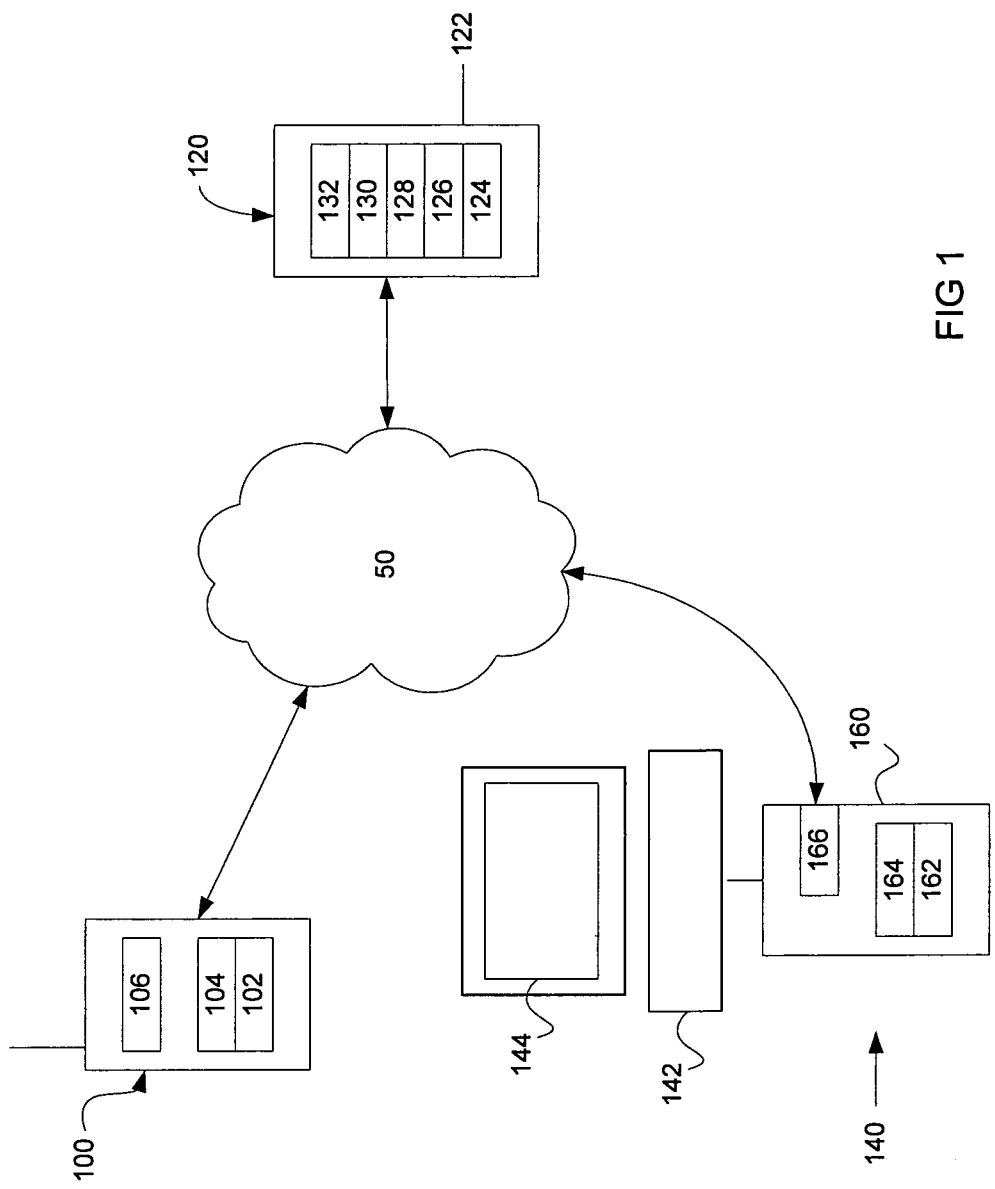
FIG. 1 is a block diagram of a preferred embodiment of an authentication system.

An authentication system, as shown in FIG. 1, includes a cellular or mobile phone 100, a server 120 of a server system, and a client device 140. The phone 100 and the client device 140 are able to communicate with the server 120 over a communications network 50. The communications network 50 includes public communications networks, such as the Internet and a mobile telephone network, such as a GSM or CDMA network. The server 120 is part of a server system, such as an online banking system, that allows users to perform transactions using the client device 140. The server 120 may comprise a single computer server 122, such as that provided by IBM Corporation, or be provided by a number of servers of the server system. The servers of the server system may be distributed and communicate using the network 50. The server 120 runs an OS 124, such as Windows Server 2003, Unix or Linux, and includes a web server 126, such as Apache, and a database server 128, such as MySQL, for maintaining a database. The server 120 also includes an authentication module 132 and an application module 130 that may be provided by computer program instruction code written in languages such as Java, MS.NET, Perl, HTML and XML. The technical processes performed by the components 124 to 132 of the server 120 may alternatively be performed at least in part by dedicated hardware circuits, such as ASICs and FPGAs. The authentication module 132 primarily controls an authentication process described herein, and the application module 130 controls processing of transactions once an authenticated session is established with the client device 140.

The client device 140 may comprise a standard computer system including a computer 160, such as a personal computer provided by IBM Corporation or Apple Computer, Inc. The computer 160 runs an OS 162, such as Windows or Mac OsX, and includes a browser 164, such as Internet Explorer or Safari. The client device 140 includes a keyboard and mouse 142 for use as an input device and a visual display 144 for use as output device. The computer 160 includes a communications interface 166 for connection to the network 50. Provided they are able to render pages served by the server 120, other client devices can be used, such as a personal digital assistant (PDA) with a microbrowser.

The cellular or mobile phone 100 may include a standard Nokia or Sony Ericsson phone or PDA, such as an iPAq, that is able to connect to a mobile or cellular telecommunications network 50 that supports data communications. For example, a number of GSM phones support data communications over the GSM network using GPRS, and WCDMA phones can support data communications using HSDPA. The phone 100 includes a display 106 and runs a mobile OS 102, such as Windows Mobile, Symbian or BREW. The phone 100 includes an authentication application 104 written in computer program instruction code, such as Java ME, that corresponds to and can run on the OS 102. The application 104 can be downloaded (over the data network 50), as desired, by a user of the phone 100 from the server 120 or another location of the server system. Once downloaded and stored, the application 104 can be invoked so as to perform a phone process, as shown in FIG. 2, of the authentication process.

Figure 2:
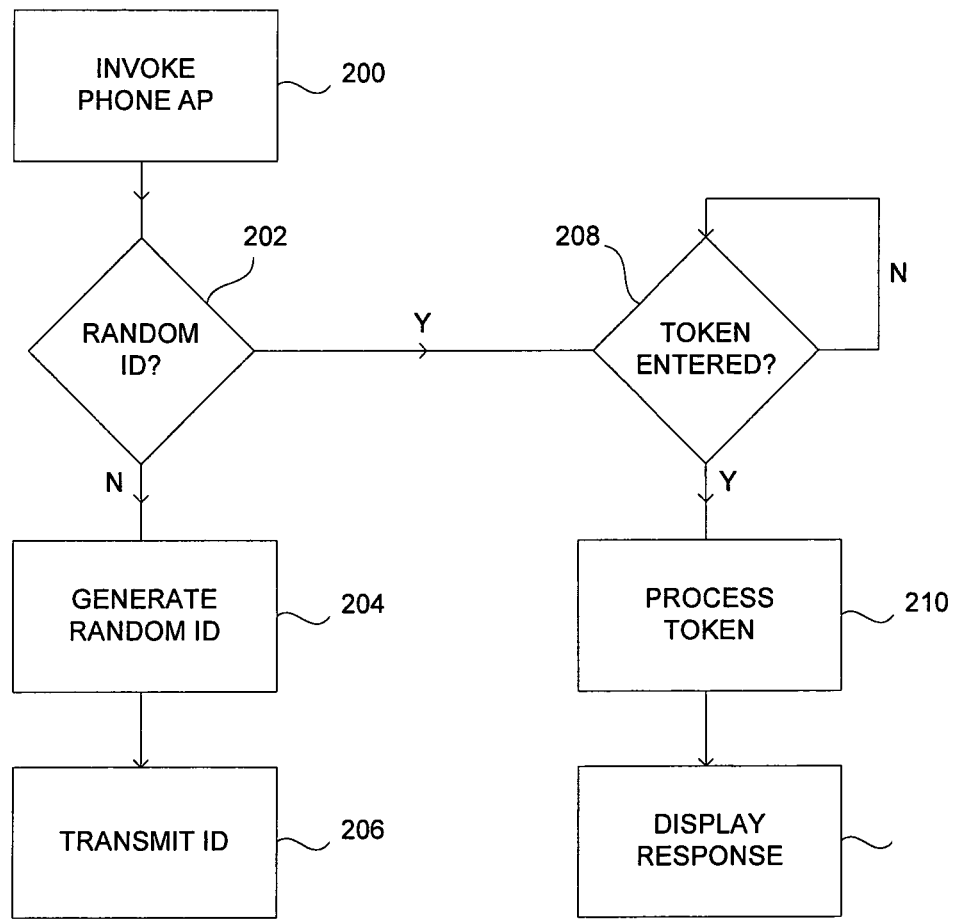
FIG. 2 is a flow diagram of processes performed by a cellular telephone of the system.
Figure 5:
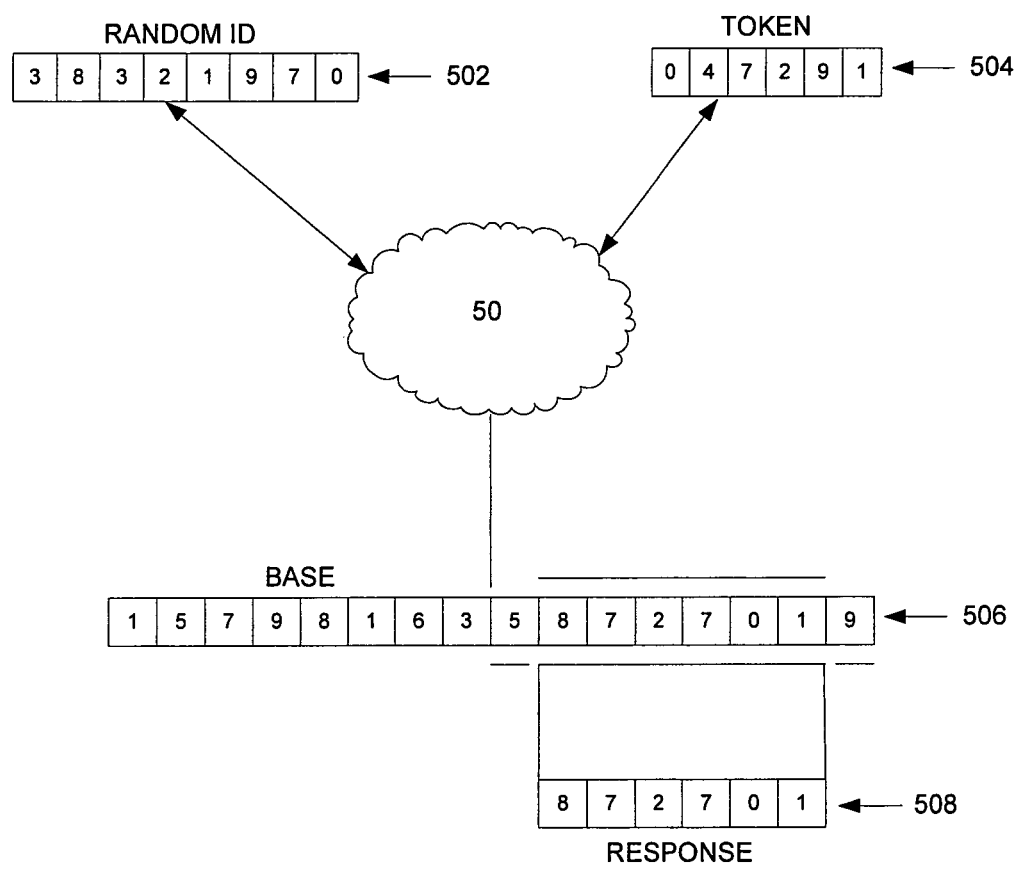
FIG. 5 is a diagram of authentication data processed by the system.

Once the authentication application 104 is invoked, the application 104 commences execution at step 200, as shown in FIG. 2, and firstly determines whether random identification data has yet been generated and stored by the application 104. If not, the application proceeds to a random identification data generation process (step 204) and generates random identification data 502, as shown in FIG. 5, representing an 8 digit random number that is unique to the phone 100 and the application 104. The random data 502 is stored in memory of the phone 100 and transmitted using the data network 50 to the server 120 (206).

Figure 3:
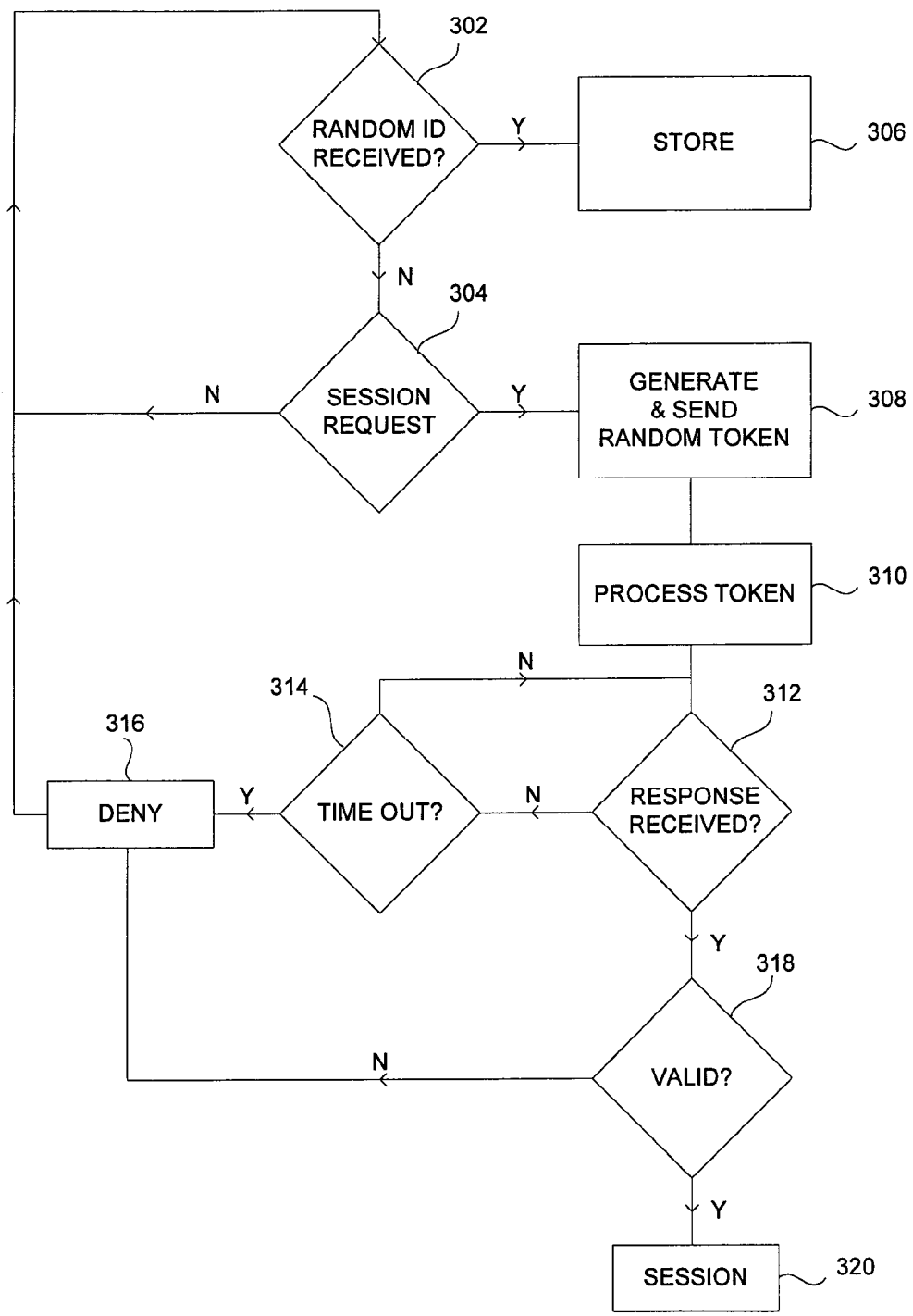
FIG. 3 is a flow diagram of processes performed by a server of the system.

The authentication module 132 executes or performs a server process, as shown in FIG. 3, of the authentication process. Communications from the phone authentication application 104 are recognised by the server 120, as the authentication module 132 continually polls for the receipt of random identification data 502 from phones 100 (step 302) and polls for requests for sessions with the online banking system (304). The random identification data 502 sent by the phone application 104 is sent with headers identifying the data as being transmitted for the authentication module 132. The headers also include the mobile phone number of the phone 100. The server process identifies that random identification data 502 as being received on the basis of the characteristic data of the headers (step 302) and the random identification data 502 is extracted from the received packet(s) and stored against a user account number using the mobile phone number as the key by the database server 128 (306).

Figure 4:
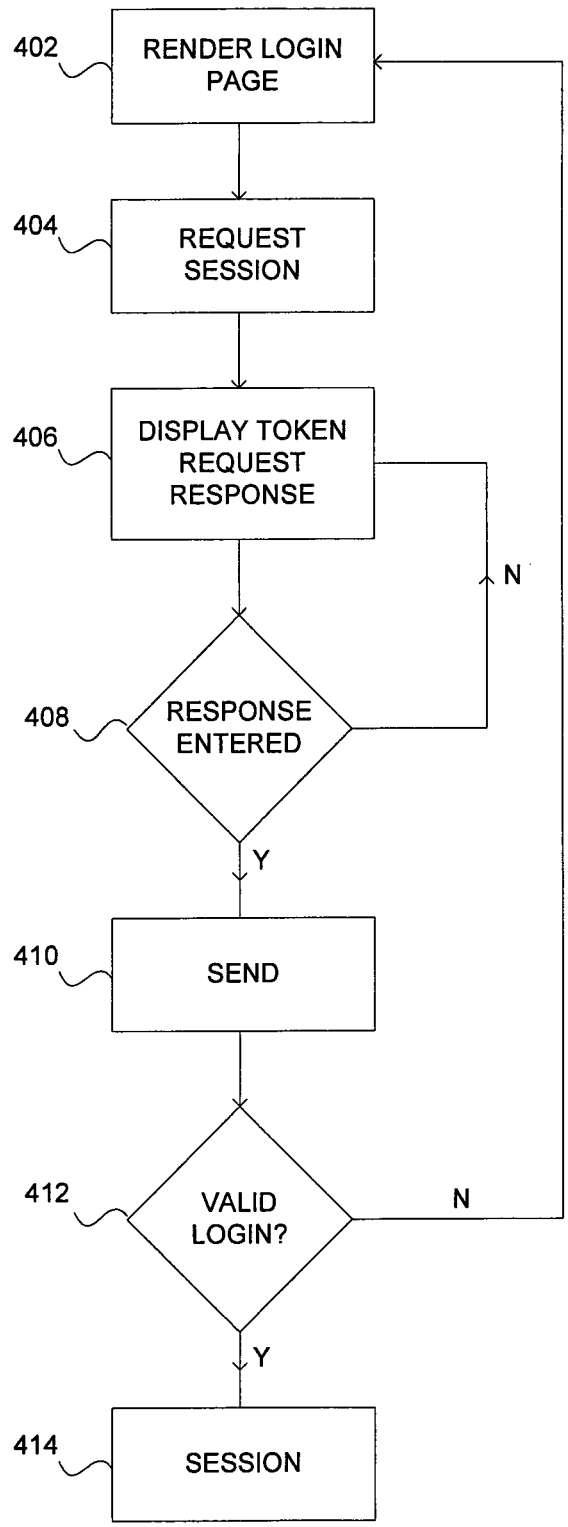
FIG. 4 is a flow diagram of processes performed by a client device of the system.

Once the phone authentication application 104 has been initially invoked so as to generate the random identification data 502 for the phone 100 and the server 120, the client device 140 can be used to access the server 120 and request a transaction session with the server system. The client device 140 performs a client process, as shown in FIG. 4, of the authentication process. A user of the client device 140 is able to invoke the browser 164 and use it to request a login page from the server 120 in order to login to the server system. The browser receives the login page from the authentication module 132, and renders the page for the user (step 402). The login page requests personal data from the user, required for the server 120 to access the stored data associated with the user. This may include a username and password combination. If the server 120 does not already store the random identification data against the mobile phone number of the user's phone 100, the login page may request the 8 digits represented by the random identification data of the phone 100. The browser 164 is used to enter the requested data on the login page and submit the data in a HTTP request (ie a GET or POST request) to the server 120 in order to request the session (step 404). The session request is detected by the server process (304) of the authentication module 132. This causes the authentication module 132 to access the random identification data 502 stored on the database for the customer's account, and execute a token data generation process (308) to generate a one time 6 digit token 504 using the random identification data 502. The generated token data is then placed in a HTTP response and returned to the client device 140. The client device 140 displays the token in an authentication page (406) that asks the user to enter response data in response (step 406). The token is displayed for the user as a six digit number represented by the data 504.

To obtain the response data that needs to be entered, the user is instructed by the authentication page to invoke the authentication application 104 on the phone 100. On invoking the application 104 (200), the application 104 generates a prompt in the display 106 asking the user to enter the token displayed by the client device 140. The user uses the keypad of the phone 100 to enter the six digit number that is displayed which causes the token data 504 to be submitted for the application 104. The application 104 processes the token data 504 using a base generation process (210). The base generation process executes an encryption algorithm, such as AES or RSA, using the stored random identification data 502 and the token data 504 to generate n digit base data 506, where n is constant selected in this example to be 16. The base generation process then selects a random sequence of the 16 digits of the base data to provide the response data 508. The response data 508 represents an adjacent sequence of k digits randomly selected, by the base process (210), from the 16 digits represented by the base data 506, where k is a constant≤n and in this example is selected to be 6. The same base process is also performed (step 310) on the random identification data and token data 504 by the authentication module 132 of the server 120 but only the base data 506 is generated. The six digits represented by the response data 508 are displayed (212) in the display 106 for the user. The user is able to read the display 106 to obtain the six digit number of the response 508, and then enter and submit the response digits using the authentication page on the client device 140. Once the response data is entered and submitted on the page (408), the client device uses a GET or POST HTTP request to send the response data 508 to the server 120.

After performing the base process (310), the server 120 polls for receipt of response data 508 from the client device 140 (312). If the requested response is not received within a predetermined period of time (314) then a deny process is performed (316), which notifies denial of the requested session and clears any token or response data generated by the server 120.

If a response is received within the predetermined time (312) a validation process (318) is performed. The validation process 318 determines if the response data 508 received by the server 120 corresponds to a sequence of 6 digits that are part of the base data 506 generated by the base process (310) of the server 120. If the response data 508 is not located as being within the base data 506 of the server 120, then the deny process (316) is performed. If the response data 508 is validly located as being a sequence of digits within the base 506, then the client device 140 is authenticated for use by the user, and in particular, is authenticated to commence a secure session (320) with the server system. A valid login response is sent to the browser 164 of the client device 140 which is processed (412) and then the browser 164 is able to commence the secure session (414) with the server system.

During the authentication process described above, all communications involving transmission of the random identification data 502, the token data 504 and the response data 508 are encrypted. However, even if the data 504 and 508 transmitted between the client device 140 and the server 120 is intercepted or obtained, it would be extremely difficult, if not impossible, to determine the relationship between the randomly generated token data 504 and the response data 508 used for each session.

Many modifications will be apparent to those skilled in the art without departing from the scope of the present invention as hereinafter described with reference to the accompanying drawings. For example, the number of digits, n, k, etc., represented by the data 502, 504, 506 and 508 may be adjusted to achieve the authentication security desired. Also the random identification data 502 need not be generated and sent by the phone application 104, but instead can be obtained by the user and sent or received by performing another registration process. For example, an interactive voice response unit or a telephone banking service can be used for the user to provide the random number or obtain it from the service for entry in the phone. The random identification number once obtained is stored by the server 120 and is stored in the phone for use by the phone application 104. User devices, other than a phone, can then be used to store and maybe generate the random identification data. For example media players, such as the Archos 704 Wi-Fi portable video player and MP3 players, such as Apple Corporation's iPod, could be used.

The invention claimed is:

1. An authentication system including:
   a user device configured to store random identification data, to generate base data by processing entered token data and the random identification data, and to randomly select a part of the base data to generate response data;
   a client device configured to request a session with a server system, to receive said token data in response to said request, and to send said response data to said server system; and
   a server of said server system configured to store said random identification data, to generate said token data on the basis of said random identification data in response to said request, and to process said response data to determine authentication for said client device for said session,
   wherein said base data represents n digits, and said response data represents a sequence of k digits randomly selected from said base data.

2. The authentication system as claimed in claim 1, wherein said server processes said token data and said random identification data to generate said base data, and authenticates said client device for said session when said base data includes said response data.

3. The authentication system as claimed in claim 1, wherein said user device generates and sends said random identification data to said server.

4. The authentication system as claimed in claim 1, wherein said user device is a mobile phone adapted to download an application for processing said random identification data and said token data.

5. One or more computer readable media devices storing computer-executable instructions that, when executed, cause one or more processors to:
   store random identification data;
   receive a request for a session from a client device;
   generate and send token data to the client device on the basis of said random identification data in response to said request;

receive response data from a user device, wherein the response data is a randomly selected part of base data, which is generated by processing the token data and the random identification data; and process said response data to determine authentication for said client device for said session, wherein said base data represents n digits, and said response data represents a sequence of k digits randomly selected from said base data.

6. The one or more computer readable media devices of claim 5, storing additional computer-executable instructions that, when executed, further cause the one or more processors to process said token data and said random identification data to generate said base data, and authenticate said client device for said session when said base data includes said response data.

7. An authentication process, including:

receiving a request for a session from a client device used by a user;

generating and sending token data to the client device, said token data being generated on the basis of stored identification data for said user;

providing an application to generate base data by processing the token data and the identification data stored on a user device, and to randomly select a part of the base data to generate response data;

receiving the response data from the client device; and processing said response data to determine authentication for said client device for said session, wherein said base data represents n digits, and said response data represents a sequence of k digits randomly selected from said base data.

8. The authentication process as claimed in claim 7, wherein said processing the response data includes processing said token data and said identification data to generate said base data, and authenticating said client device for said session when said base data includes said response data.

9. The authentication process as claimed in claim 7, wherein said user device is a mobile phone adapted to download said application for processing said identification data and said token data.

10. The authentication process as claimed in claim 7, wherein said identification data is randomly generated for said user and stored on said user device.

11. The authentication process as claimed in claim 9, wherein said identification data is randomly generated for said user and stored on said user device.

12. The authentication system as claimed in claim 1, wherein said base data is generated using an encryption algorithm.

13. The one or more computer readable media devices as claimed in claim 5, wherein said base data is generated using an encryption algorithm.

14. The authentication process as claimed in claim 7, wherein said base data is generated using an encryption algorithm.

15. The authentication system as claimed in claim 3, wherein said user device is a mobile phone adapted to download an application for processing said random identification data and said token data.

16. The authentication process as claimed in claim 8, wherein said user device is a mobile phone adapted to download said application for processing said identification data and said token data.

17. The authentication system of claim 1, wherein k is less than n, and the sequence of k digits are consecutive digits within the n digits.

18. The one or more computer readable media devices of claim 5, wherein k is less than n, and the sequence of k digits are consecutive digits within the n digits.

19. The authentication process of claim 7, wherein k is less than n, and the sequence of k digits are consecutive digits within the n digits.

* * * * *